United States Patent [19]
Gaskins et al.

[11] Patent Number: 5,463,643
[45] Date of Patent: Oct. 31, 1995

[54] REDUNDANT MEMORY CHANNEL ARRAY CONFIGURATION WITH DATA STRIPING AND ERROR CORRECTION CAPABILITIES

[75] Inventors: Darius D. Gaskins, Austin; Terry J. Parks, Round Rock, both of Tex.

[73] Assignee: Dell USA, L.P., Austin, Tex.

[21] Appl. No.: 207,009

[22] Filed: Mar. 7, 1994

[51] Int. Cl.$^6$ .......................... H03M 13/00; G06F 11/00
[52] U.S. Cl. .................. 371/40.1; 371/40.4; 395/821; 395/183.19; 395/182.07
[58] Field of Search ................ 371/40.1, 7, 10.1, 371/10.2, 11.1, 40.1, 40.2, 40.4; 395/425, 575

[56] References Cited

U.S. PATENT DOCUMENTS

| | | | |
|---|---|---|---|
| 4,092,732 | 5/1978 | Ouchi | 364/900 |
| 5,301,297 | 4/1994 | Menon et al. | 395/425 |
| 5,305,326 | 4/1994 | Solomon et al. | 371/11.1 |
| 5,309,451 | 5/1994 | Noya et al. | 371/40.4 |
| 5,315,602 | 5/1994 | Noya et al. | 371/40.4 |

*Primary Examiner*—Roy N. Envall, Jr.
*Assistant Examiner*—Emmanuel L. Moise
*Attorney, Agent, or Firm*—Jeff Hood; David McCombs; James Huffman

[57] ABSTRACT

A memory channel array configuration wherein two or more memory channels are used for data transfer and data is striped across each of the memory channels. In addition, one or more redundant memory channels, preferably a single dedicated parity channel, are used for error correction. In the preferred embodiment the memory channel configuration utilizes RAMBUS based memory channels, and thus the present invention provides error correction for a RAMBUS based memory system. Also, the use of multiple memory channels in conjunction with data striping across each of the channels allows for much higher data transfer bandwidths than is available using prior art implementations of RAMBUS technology.

11 Claims, 4 Drawing Sheets

MEMORY CHANNEL ARRAY CONTROLLER
(MEMORY TO HOST DATA TRANSFER LOGIC)

REDUNDANT MEMORY CHANNEL ARRAY CONFIGURATION WITH DATA STRIPING AND ERROR CORRECTION CAPABILITIES

FIELD OF THE INVENTION

The present invention relates to computer memory systems, and more particularly to a memory channel array configuration which stripes data across a plurality of memory channels and includes a redundant memory channel to provide error correction capabilities in case of a memory channel failure.

DESCRIPTION OF THE RELATED ART

Computer systems continue to increase in both speed and complexity. One recent development in computer system technology is a memory system referred to as RAMBUS. RAMBUS includes a memory channel specification and associated DRAM technology that provides increased performance over prior memory system designs, providing up to 500 Mbytes per second of data transfer bandwidth. The RAMBUS memory channel specification includes an 8 bit data path, a parity bit, and various control, power, and ground signals. One potential problem with the RAMBUS specification is that parity checking is provided only for memory error detection, and there is no provision for error correction. This is a major drawback for systems where error correction is a requirement. Further the maximum data transfer bandwidth of 500 Mbytes per second may not be sufficient for certain high end systems where high data transfer bandwidth is required. Therefore an improved memory channel configuration is desired which provides error correction capabilities for existing memory channel specifications, such as RAMBUS, which do not inherently include any type of error correction capability. An improved memory channel configuration is also desired which can increase the bandwidth capacity of existing memory channel and memory system specifications.

Background on various RAID (redundant array of inexpensive disks) implementations is deemed appropriate. A recent trend in computer systems has been to link together a plurality of disks through hardware to form a drive array now known as a redundant array of inexpensive disks, or RAID. In this manner, a number of individual hard disks are combined to create a massive virtual system. The drives in the array are coordinated with each other and data is specially allocated between them. Typically, data is split between the drives at the bit or byte level. For example, in a four drive system, two bits of every byte might come from the first hard disk, the next two bits from the second hard disk, and so on. The four drives then output a single byte data stream four times faster than a serial drive implementation, i.e., transferring all the information comprised in a byte takes only as long as required for a single drive to transfer two bits. This technique of splitting data between several drives is referred to as data striping. Operating multiple individual disks together as an array allows for higher speeds, improved reliability, and greater resistance to errors than can be achieved by operating each disk independently.

One possible drawback to data striping is that the failure of any drive in the system results in the complete failure of the entire system. Therefore, various methods have been developed to use a portion of the capacity of the drive array to yield more reliable and fault-tolerant storage systems. This increased reliability and fault-tolerance is achieved through various redundancy measures, including mirroring and parity implementations. Currently, five levels of RAID technology are now recognized. Each of these implementations have various tradeoffs regarding efficient use of drive capacity, fewest number of drives, greatest reliability, and best performance. RAID 1 is the simplest drive array implementation and comprises two equal capacity disks that mirror each other. One disk duplicates all the files of the other, essentially serving as a backup copy. RAID 2 interleaves bits or blocks of data, i.e., implements data striping as explained above, and uses one or more redundant disks to correct single bit errors and detect double bit errors. The number of extra disks required depends upon the particular error correction algorithm used. RAID 3 implements data striping and includes one or more extra drives for parity checking, but does not provide error correction. RAID 4 interleaves sectors of data, not bits or blocks. In addition, the sectors are read serially, as if the drives in the array were functionally one large drive with more heads and platters. One drive in the array is dedicated to parity checking for reliability. In the RAID 5 implementation, the disk array does not include a single dedicated parity drive as in RAID 4, but rather the parity check function is rotated throughout the various drives in the array. In this manner, error checking is distributed across all of the disks in the array.

SUMMARY OF THE INVENTION

The present invention comprises a memory channel array configuration wherein two or more memory channels are used for data transfer and data is striped across each of the memory channels. In addition, one or more redundant memory channels, preferably a single dedicated parity channel, are used for error correction. In the preferred embodiment the memory channel configuration utilizes RAMBUS based memory channels, and thus the present invention provides error correction for a RAMBUS based memory system. Also, the use of multiple memory channels in conjunction with data striping across each of the channels allows for much higher data transfer bandwidths than is available using prior art implementations of RAMBUS technology.

In the preferred embodiment, a memory channel array controller is coupled between the CPU and main memory. The memory channel array controller includes four individual channel controllers which control four corresponding RAMBUS data transfer channels, respectively. The four channel controllers are configured to stripe data across each of the channels. In the preferred embodiment, the array controller performs 32 bit transfers by striping 8 bits of data across each of the channels. The memory channel array controller also includes a redundant fifth channel control which controls a redundant channel, preferably a parity channel.

For data being transferred from a host to main memory, a buffer receives the incoming data and stripes the data across four internal data buses. Parity generation logic performs a parity computation of the data patterns to be transferred on the four data transfer channels, and this parity information is provided through a channel controller to main memory using the dedicated parity channel. When data is being transferred from main memory to a requesting host, each respective channel controller performs a parity check for each channel. If an error occurs on a respective channel, the corresponding channel controller generates a parity error signal to identify the channel. If necessary, error correction logic then reconstructs the correct data from the parity data and the correct data on the other buses. If a parity error occurs on the dedicated parity channel, i.e., the parity channel is bad, then the parity data is ignored, and the correct data on the four data transfer channels is passed through to the requesting host. If a parity error occurs on a data transfer channel, the correct data for that channel is reconstructed using the parity data from the dedicated parity channel and the correct data on the remaining three buses.

The present invention thus provides error correction for memory channel systems, for example RAMBUS based memory systems, where the memory channel specification being used does not inherently provide for error correction. The present invention further provides a greater memory redundancy than in typical error correction code (ECC) systems. In the preferred embodiment of the invention, an entire RAMBUS memory channel including the respective controller, transceivers, and memory chips can be lost, and enough redundancy remains to reconstruct the correct data.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
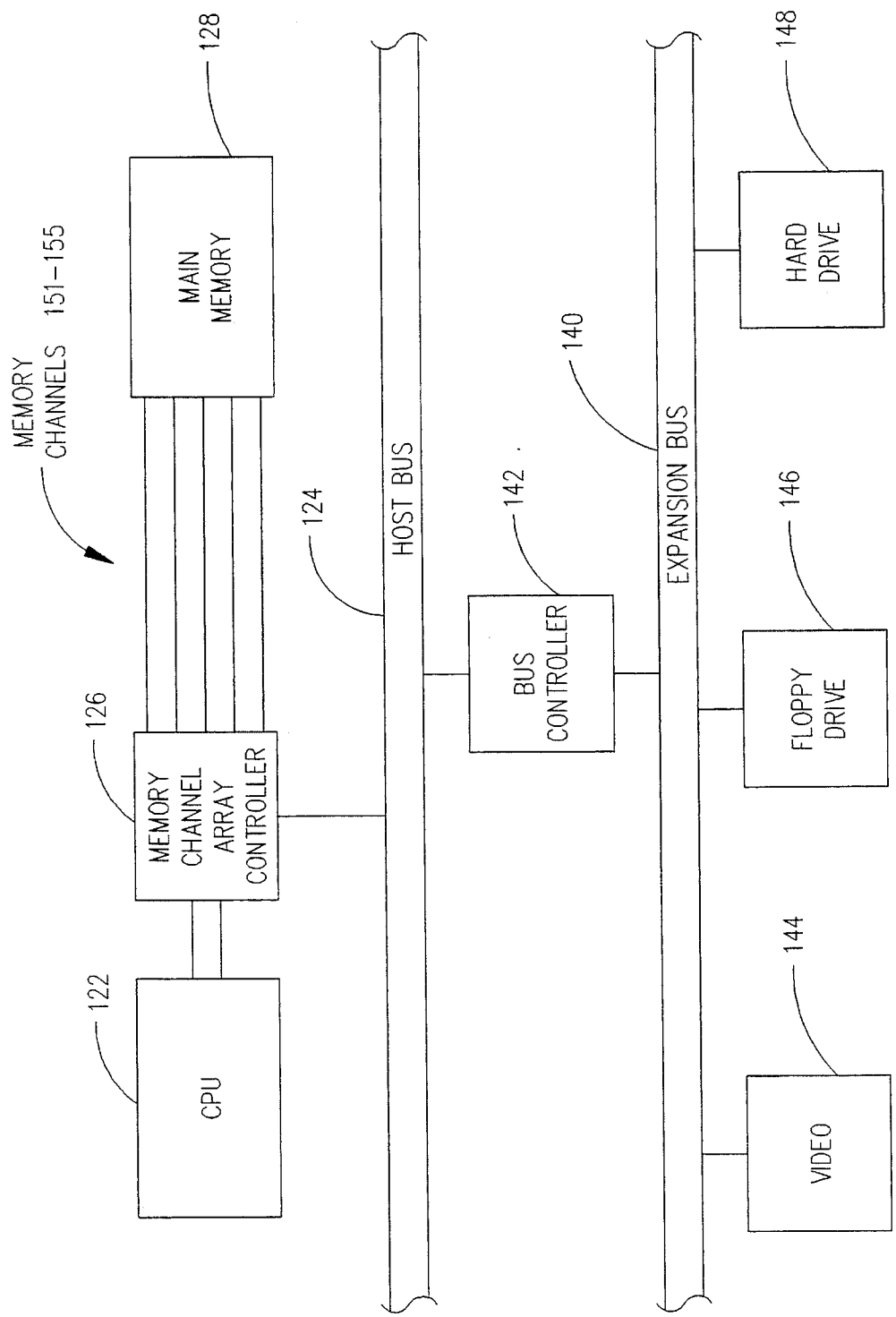
FIG. 1 is a block diagram of a computer system including a memory channel array configuration of the present invention.

Referring now to FIG. 1, a computer system incorporating a redundant memory channel array according to the present invention is shown. The elements of a computer system not necessary to understand the operation of the present invention have been omitted from FIG. 1 for simplicity. The computer system includes a central processing unit or CPU 122 which is coupled to memory channel array controller 126. The memory channel array controller 126 is coupled to main memory 128 through a plurality of memory channels 151–155. The memory channel array controller 126 is also coupled to a host bus 124. Various devices (not shown) may be coupled to the host bus 124 as desired. The host bus 124 is coupled to an expansion or input/output (I/O) bus 140 by means of a bus controller 142. The expansion bus 140 includes slots for various other devices, including video 144, a floppy drive 146 and hard drive 148, as desired.

The redundant memory channel array of the present invention provides error correction capabilities which are not available in many single memory channel-based systems. The present invention further provides increased data transfer bandwidth over single memory channel systems. In the preferred embodiment, the memory channel array controller 126 incorporates RAMBUS technology, and the memory channels 151–155 are preferably based on the RAMBUS specification. Further, the main memory 128 preferably incorporates RAMBUS technology DRAM (dynamic random access memory). Thus the present invention provides error correction to a memory system based on RAMBUS technology. In contrast, prior art memory systems using RAMBUS technology have no provision for error correction. For more information on RAMBUS memory system technology, please see "RAMBUS Architectural Overview," version 2.0, published July 1993 by RAMBUS, Inc., and "Applying RAMBUS Technology to Desktop Computer Main Memory Subsystems," Version 1.0 published March 1992 by RAMBUS, Inc., which are both hereby incorporated by reference. It is noted that other types of bus or memory channel technologies based on other specifications may be used in conjunction with the present invention, as desired.

In the preferred embodiment of the invention, five memory channels 151–155 are coupled between the memory channel array controller 126 and main memory 128. The four memory channels 151–154 preferably are data transfer channels and each include 8 bits of data and one parity bit. The memory channels 151–154 also include various handshaking signals as well as power and ground signals. For more information on the various signals comprising a RAMBUS memory channel, please see the above-referenced RAMBUS articles. The memory channel 155 is preferably identical to the memory channels 151–154, but acts as a redundant channel, preferably a dedicated parity channel, which stores parity data for the data being transferred across the memory channels 151–154. In the preferred embodiment, 32 bits of data are striped across each of the four channels 151–154 wherein each channel carries 8 bits of the 32 bit word. Accordingly, 32 bit data transfers can occur using the memory channel array of the present invention during the time that a configuration using a single RAMBUS memory channel would require to transfer eight bits. Thus, the channel array configuration of the present invention allows for a data transfer bandwidth of 2 Gbytes/sec, which is four times the data bandwidth of prior art RAMBUS configurations consisting of only one RAMBUS memory channel.

Figure 2:
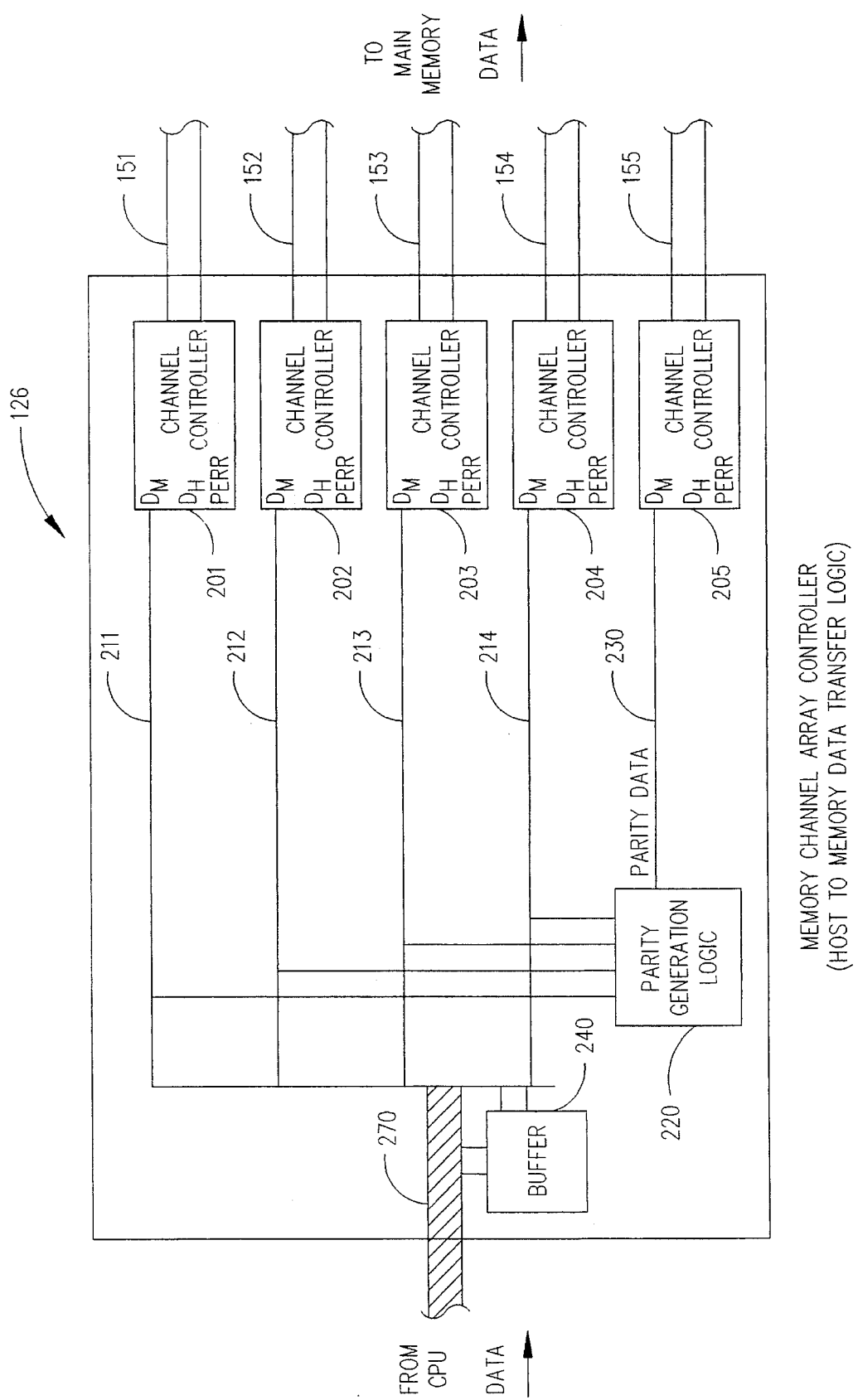
FIG. 2 illustrates a portion of the logic in the memory channel array controller of FIG. 1 showing parity generation logic for data being transferred from a host to main memory.
Figure 3:
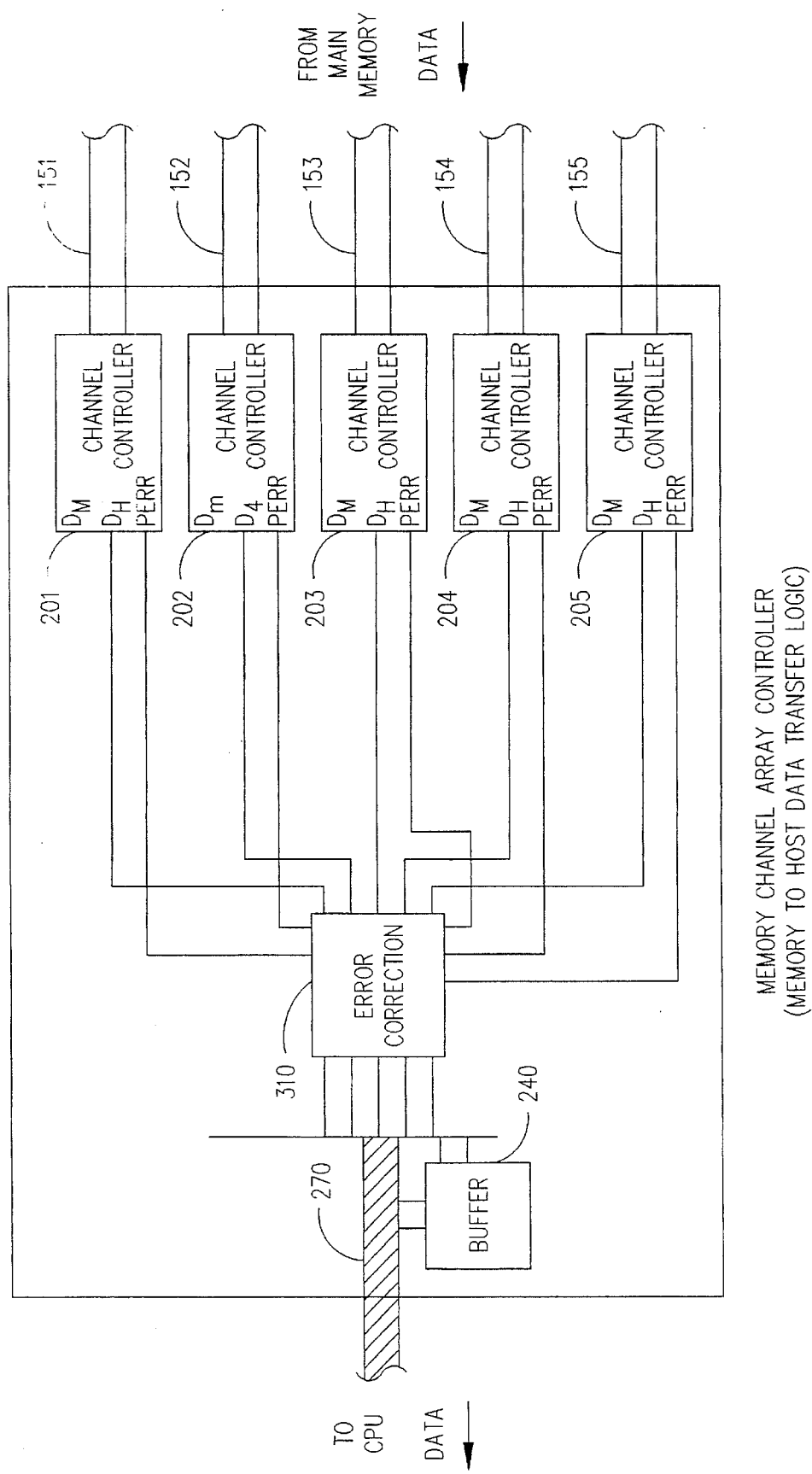
FIG. 3 illustrates a portion of the logic in the memory channel array controller of FIG. 1 showing error correction logic for data being transferred from main memory to a host.

Referring now to FIGS. 2 and 3, the logic comprised in the memory channel array controller 126 is shown in two different figures for ease of illustration. FIG. 2 illustrates the portion of the memory channel array controller 126 which handles data transfer from a host to main memory 128. FIG. 3 illustrates the portion of the memory channel array controller 126 which handles data transfers from main memory 128 to a requesting host. It is noted that FIGS. 2 and 3 do not illustrate logic in the memory channel array controller 126 that is considered unnecessary to understand the operation of the present invention.

Referring now to FIG. 2, the memory channel array controller 126 couples to the CPU 122 on one side, preferably through a 64-bit or 128-bit data path 270, and couples to main memory 128 on the other side, preferably through the 5 memory channels 151–155. The memory channel array controller 126 includes 5 preferably identical channel controllers 201–205 which control corresponding memory channels 151–155. The channel controllers 201–205 incorporate RAMBUS control block (RCB) logic for controlling the RAMBUS based memory channels 151–155, i.e., the channel controllers 201–205 each include controller, transceiver and buffering logic for interfacing with the respective corresponding memory channels 151–155. For more information on RAMBUS control block logic, please see the above-referenced RAMBUS articles.

The memory channel array controller 126 receives data from a host in 64 or 128 bit chunks and preferably stores this data in a buffer 240. Data from the buffer 240 is then provided to the respective channel controllers 201–204 32 bits at a time. These 32 bits of data are referred to as DATA<0:31>. As shown in FIG. 2, 32 bits of data from a host, such as the CPU 122, is provided into the buffer 240, and the buffer 240 operates to split or stripe the data into four individual bytes or 8 bit portions over four individual 8 bit buses 211–214. These four bytes are provided to the respective channel controllers 201–204. In the preferred embodiment, the bus 211 transmits the DATA<0:7> signals, the bus 212 transmits the DATA<8:15> signals, the bus 213 transmits the DATA<16:23> signals, and the bus 214 transmits the DATA<24:31> signals. Each channel controller 201–204 includes 8 data inputs referred to collectively as $D_M$ which receives the respective byte of data, and this data is then provided over the respective memory channel 151–154 to main memory 128.

The memory channel array controller 126 further comprises parity generation logic 220 coupled to each of the four 8 bit buses 211–214 which receives the data provided over these buses to the respective channel controllers 201–204. The parity generation logic 220 generates parity data that is provided over an 8 bit bus 230 to the $D_M$ inputs of the channel controller 155. In this manner, when data is received by the memory channel array controller 126 for transfer to main memory 128, the parity generation logic 220 uses the data provided to each of the channel controllers 201–204 to compute parity data which is provided to the channel controller 205. Once each of the four bytes of data have been received by the respective channel controllers 201–204, and the parity data has been computed and provided to the channel controller 205, the channel controllers 201–205 then preferably output their respective data simultaneously to main memory 128.

Figure 4:
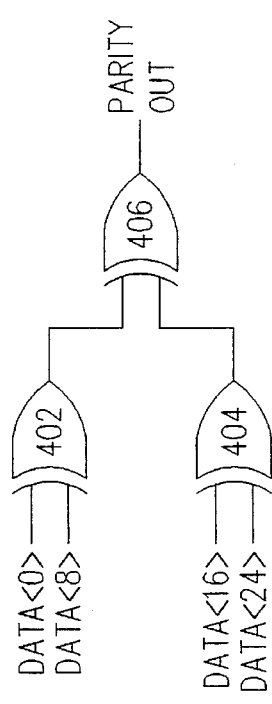
FIG. 4 illustrates a portion of the parity generation logic of FIG. 2.

The parity generation logic 220 preferably performs an exclusive OR (XOR) of the data patterns provided over the 8 bit buses 211–214 to the respective channel controllers 201–204 to generate the required parity. Referring now to FIG. 4, a portion of the parity generation logic 220 is shown. The portion of the parity generation logic 220 shown in FIG. 4 computes the parity corresponding to the first bit in each of the four bytes transferred on the buses 211–214. As shown, the DATA<0> and DATA<8> signals are provided to inputs of a two input XOR gate 402 whose output is connected to the input of an XOR gate 406. The DATA<16> and DATA<24> signals are connected to inputs of a two input XOR gate 404 whose output is connected to the other input of the XOR gate 406. The output of this XOR gate 406 is parity data that is provided to the respective channel controller 205. As mentioned above, this logic computes the parity for the first bit of each of the bytes being transferred by the buses 211–214 to the respective channel controllers 201–214. The parity generation logic 220 includes similar logic for each of the remaining bits in the byte which compute parity for the DATA<1>, DATA<9>, DATA<17>, and DATA<25> signals, the DATA<2>, DATA<10>, DATA<18> and DATA<26> signals and so on. In the preferred embodiment even parity is used, although either even or odd parity may be used as desired.

Referring now to FIG. 3, the portion of logic in the memory channel array controller 126 involved with transferring data from main memory 128 to a requesting host such as the CPU 122 is shown. As shown, each of the channel controllers 201–205 includes 8 data bit outputs referred to collectively as $D_H$, which is used in transferring data from main memory 128 to a requesting host. In a transfer from main memory 128 to a requesting host, 8 bits of data are provided on each of the memory channels 151–155 to their corresponding channel controllers 201–205, respectively. These bytes of data are provided from the $D_H$ outputs of the channel controllers 201–205 to error correction logic 310. The channel controllers 201–205 also include parity error signals which are provided as outputs to the error correction logic 310. When each of the channel controllers 201–205 receive a transfer from main memory 128, this transfer will include 8 bits of data as well as a single parity bit associated with the respective 8 bits. When the respective channel controllers 201–205 receive data from main memory 128, logic in each respective channel controller 201–205 determines if the parity is correct. If parity is correct in all five of the channel controllers 201–205, then the data is provided through the error correction logic 310 and out of the memory channel array controller 126 to the requesting host, typically the CPU 122. If a parity error is detected in any of the five channel controllers 201–205, then the error correction logic 310 operates to compensate for the incorrect data and provide correct data out to the requesting host. If the parity error is generated by the redundant channel controller 205, then the parity data is preferably ignored and the bytes from each of the channel controllers 201–204 pass straight through the error correction logic 310 to the requesting host. If the parity error is generated by one of the channel controllers 201–204, then the error correction logic 310 utilizes the correct data from the three remaining channel controllers as well as the parity data in the channel controller 205 to reconstruct the data from the channel controller that reported the parity error. This reconstructed data is then provided as part of the data output to the host along with the correct data from the other three controllers. The buffer 240 receives this data and outputs a single 32 bit word.

Figure 5:
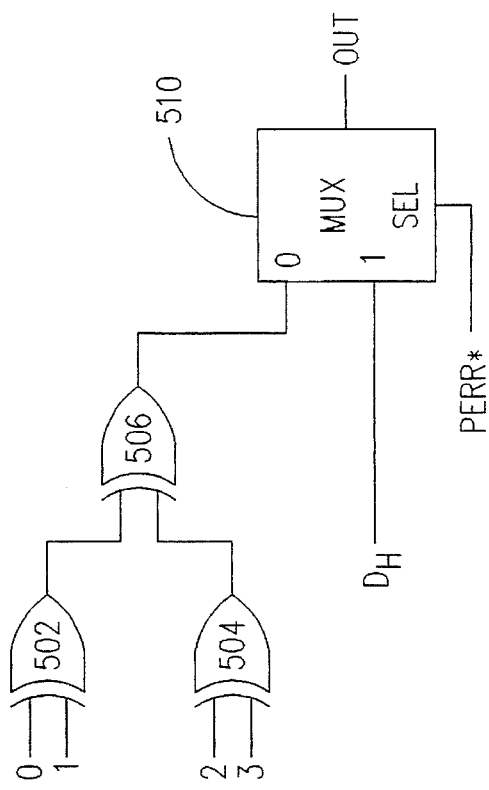
FIG. 5 illustrates a portion of the error correction logic of FIG. 3.

Referring now to FIG. 5, a portion of the error correction logic 310 is shown. As shown, the error correction logic includes two 2 input XOR gates 502 and 504, which receive as inputs the correct data t? om the three channel controllers which did not report parity errors and the parity data from the channel controller 205. A bit from each of these four bytes, i.e., the three correct data bytes and the one parity byte, are provided to the respective inputs of the two XOR gates 502 and 504. The outputs of the respective gates 502 and 504 are provided to inputs of a two input XOR gate 506, whose output is connected to one input of a two input multiplexor 510. The other input of the multiplexor 510 receives the data from the respective channel controller that does not provide input to either of the XOR gates 502 or 504, i.e., the channel controller whose data is being reconstructed by the XOR gates 502–506. The select input of the multiplexor receives the parity error signal PERR# from the respective channel controller whose data is being reconstructed by the XOR gates 502–506. The output of the multiplexor 510 is provided out of the memory channel array controller 126 to the requesting host. If no parity error is generated, then the multiplexor 510 selects the data path $D_H$ and the original data from the respective channel controller is passed straight through the error correction logic 310 and to the requesting host. If a respective channel controller asserts a parity error, then the multiplexor 510 selects the error corrected path wherein the correct data from the three channels not reporting a parity error and the parity data are XORed together to produce the correct data for the respective channel controller reporting the parity error. It is noted that FIG. 5 illustrates only a portion of the error correction logic, and that this logic is provided for each of the bits comprising a byte of data and is further provided for each of the channel controllers 201–204.

Therefore, the memory channel array configuration of the present invention provides data striping as well as error correction capabilities to memory systems that do not inherently include error correction. When an error occurs, parity check logic in a respective channel controller detects the error and identifies the channel carrying the incorrect data. The correct data for that erroneous channel can then be reconstructed from the parity data and the correct data from the other channels. Thus, the present invention provides error correction for RAMBUS based memory systems. The present invention further provides memory redundancy greater than typical error correction coded systems because an entire RAMBUS channel, including the subcontroller, transceivers, and buffers can be lost and enough redundancy remains to reconstruct the correct data.

It is noted that alternate embodiments of the invention comprising memory channel configurations having a different number of memory channels may be used, as desired. A three channel configuration preferably includes two data transfer channels and one redundancy or parity channel. In this embodiment data is striped across the two data transfer channels eight bits apiece for a 16 bit transfer, and thus two data transfers can occur in the time that would normally be taken for a single eight bit transfer in a single channel configuration. The parity information is computed from the two bytes of data, and this parity data is transferred on the third channel. Likewise, any number of memory channels may be included in a channel array configuration according to the present invention. Further, the channel array configuration of the present invention may be utilized in various types of data transfer bus implementations.

It is further noted that any of the various types of RAID configurations, i.e., RAID 1–5 can be applied to the memory channel array configuration of the present invention. For example, in a RAID 1 scheme applied to a four channel configuration, two channels could be utilized for data transfer with the remaining two channels used for mirroring. Alternatively, parity information could be rotated throughout the various memory channels in the configuration as in a RAID 5 implementation to distribute the error checking across all of the channels in the configuration. Likewise, any of the various RAID configurations commonly used for disk arrays can be applied to the memory channel array system of the present invention.

Although the method and apparatus of the present invention has been described in connection with the preferred embodiment, it is not intended to be limited to the specific form set fourth herein, but on the contrary, it is intended to cover such alternatives, modifications, and equivalents, as can be reasonably included within the spirit and scope of the invention as defined by the appended claims.

We claim:

1. A memory channel array system providing error correction capabilities, comprising:

a main memory;

a memory channel array controller; and a first plurality of channels coupled between said memory channel array controller and said memory for transferring data between said memory channel array controller and said memory, said first plurality of channels including at least one redundant channel;

wherein said memory channel array controller includes:

a first plurality of channel controllers corresponding to said first plurality of channels, each of said first plurality of channel controllers being coupled to a corresponding one of said first plurality of channels, wherein each of said first plurality of channel controllers generates a signal indicative of incorrect data transferred on said corresponding channel; and error correction logic coupled to said first plurality of channel controllers which receives data from each of said channel controllers and said incorrect data indicating signals from said channel controllers and outputs corrected data if one of said incorrect data indicating signals indicates incorrect data.

2. The memory channel array system of claim 1, wherein said memory channel array controller includes:

a buffer for connecting to one or more host devices, wherein said buffer is adapted for transferring and receiving data to and from said one or more host devices; and a second plurality of internal buses coupled between said buffer and a second number of said first plurality of channel controllers, wherein said second plurality of internal buses transfers data between said buffer and said second number of said first plurality of channel controllers;

wherein said buffer stripes data across said second plurality of internal buses to said second number of said first plurality of channel controllers.

3. The memory channel array system of claim 2, wherein said at least one redundant channel comprises a parity channel for transferring parity data, said error correction logic comprises:

means for determining if one of said second number of said first plurality of channel controllers has received incorrect data; and means for generating corrected data in place of said incorrect data which includes a multiplexor which selects between data output from a respective channel controller and corrected data;

the memory channel array controller further comprising:

parity generation logic coupled to said second plurality of internal buses for generating parity data based on data being transferred on said second plurality of internal buses to said second number of said first plurality of channel controllers; and a parity bus coupled between said parity generation logic and the channel controller corresponding to said parity channel for transferring said parity data from said parity generation logic to said channel controller corresponding to said parity channel.

4. The memory channel array system of claim 1, wherein each of said first plurality of channels carries a plurality of data bits and at least one parity bit;

wherein each of said channel controllers includes parity error detection logic which analyzes said at least one parity bit and said corresponding channel and determines if a parity error has occurred, wherein said incorrect data indicating signals comprise parity error signals.

5. The memory channel array system of claim 1, wherein said memory channel array system is a RAMBUS memory system and said first plurality of channels conform to the RAMBUS specification.

6. A memory channel array system providing error correction capabilities, comprising:

a main memory;

a memory channel array controller;

a first plurality of channels coupled between said memory channel array controller and said main memory for transferring data between said memory channel array controller and said main memory, said first plurality of channels including at least one redundant channel;

wherein said memory channel array controller includes:

means for generating a first plurality of signals indicative of incorrect data transferred on said first plurality of channels;

error correction logic coupled to said first plurality of channels and said signal generating means which receives data from each of said channels and said incorrect data indicating signals from said signal generating means and outputs corrected data if one of said incorrect data indicating signals indicates incorrect data.

7. A memory channel array system providing data striping capabilities, comprising:

a main memory;

a memory channel array controller including a first plurality of channel controllers;

a first plurality of channels coupled between said memory channel array controller and said main memory for transferring data between said memory channel array controller and said main memory, said first plurality of channels including at least one redundant channel;

wherein said memory channel array controller includes:

a buffer for connecting to one or more host devices, wherein said buffer is adapted for transferring and receiving data to and from said one or more host devices;

a first plurality of internal buses coupled between said buffer and a first number of said first plurality of channel controllers, wherein said first plurality of internal buses transfer data between said first number of said first plurality of channel controllers and said buffer;

a second plurality of internal buses coupled between said buffer and a second number of said first plurality of channel controllers, wherein said second plurality of internal buses transfers data between said buffer and said second number of said first plurality of channel controllers;

wherein said buffer stripes data received from said one or more host devices across said second plurality of internal buses to said second number of said fist plurality of channel controllers.

8. The memory channel array system of claim 7, wherein said at least one redundant channel comprises a parity channel for transferring parity data, the memory channel array controller further comprising:

parity generation logic coupled to said second plurality of internal buses for generating parity data based on data being transferred on said second plurality of internal buses to said second number of said first plurality of channel controllers; and a parity bus coupled between said parity generation logic and the channel controller corresponding to said parity channel for transferring said parity data from said parity generation logic to said channel controller corresponding to said parity channel.

9. The memory channel array system of claim 8, wherein said first number of said first plurality of channel controllers each generate a signal indicative of incorrect data transferred on said corresponding channel, the memory channel array controller further comprising:

error correction logic coupled to said first plurality of channel controllers which receives data from each of said channel controllers and said incorrect data indicating signals from said channel controllers and outputs corrected data on said first plurality of said internal buses if one of said incorrect data indicating signals indicates incorrect data.

10. A method of transferring data to and from main memory in a memory channel array system comprising a main memory, a memory channel array controller including a first plurality of channel controllers, and a first plurality of channels coupled between said memory channel array controller and said main memory for transferring data between said memory channel array controller and said main memory, wherein said first plurality of channels includes at least one redundant channel, and wherein the memory channel array controller includes redundant data generation logic, a buffer and a second plurality of internal buses coupled between the buffer and a second number of said first plurality of channel controllers, the method comprising the steps of:

the buffer receiving data from a host;

the buffer striping said data on the second plurality of internal buses to said second number of said first plurality of channel controllers;

the redundant data generation logic generating redundant data based on said received data from said host;

the redundant data generation logic providing said redundant data to said at least one redundant channel; and the first plurality of channel controllers transferring said data received from said host and said redundant data to said main memory using said first plurality of channels.

11. The method of claim 10, wherein the memory channel array system further comprises error correction logic coupled between said first plurality of channel controllers and said buffer, the method further comprising:

the main memory transferring data to said first plurality of channel controllers;

the first plurality of channel controllers determining if a data error has occurred;

the error correction logic correcting the data subject to the data error using the redundant data; and the memory channel array system outputting said data including said corrected data to a requesting host.

* * * * *